United States Patent [19]
Mayfield, Jr. et al.

[11] Patent Number: 6,021,959
[45] Date of Patent: Feb. 8, 2000

[54] VEHICLE MOUNTED FLUID DELIVERY SYSTEM WITH RETRACTABLE ARM

[75] Inventors: John M. Mayfield, Jr.; Ted E. Mayfield, both of Ukiah; Mark L. Natalizia, Willits, all of Calif.

[73] Assignee: MotivePower Investments Limited, Pittsburgh, Pa.

[21] Appl. No.: 09/149,358

[22] Filed: Sep. 8, 1998

Related U.S. Application Data

[63] Continuation-in-part of application No. 08/925,653, Sep. 9, 1997.

[51] Int. Cl.[7] .............................. B02B 1/20; A01G 27/00
[52] U.S. Cl. ................................ 239/67; 239/73; 239/165
[58] Field of Search ................... 239/62, 64, 69, 239/66, 67, 99–100, 71–73, 146, 155, 159–175; 118/323

[56] References Cited

U.S. PATENT DOCUMENTS

| | | | |
|---|---|---|---|
| 4,230,280 | 10/1980 | Leigh et al. | 239/677 |
| 4,447,007 | 5/1984 | Farines | 239/165 |
| 4,718,439 | 1/1988 | Gorra et al. | 134/57 |
| 5,012,608 | 5/1991 | Brown | 47/1.7 |
| 5,280,685 | 1/1994 | Turner | 47/1.7 |
| 5,348,226 | 9/1994 | Heiniger et al. | 239/1 |
| 5,358,568 | 10/1994 | Okano et al. | 118/323 |
| 5,755,382 | 5/1998 | Skotinov | 239/161 |

FOREIGN PATENT DOCUMENTS 2 038 153   12/1978   United Kingdom .

OTHER PUBLICATIONS

Patchen® Selective spray Systems, Los Gatos, California, brochure entitled "Put A Stop To Rising Weed Control Costs" (4 pages).

PBM, Chico, California, catalog pp. 12 and 24 for Skid Sprayers and Self–Propelled Sprayers.

PBM, Chico, California, catalog pp. 40–41, for Raven Industries SCS440 Control Console, SCS440 Sprayer System Components.

*Primary Examiner*—Andres Kashnikow
*Assistant Examiner*—Jorge Bocanegra
*Attorney, Agent, or Firm*—Knobbe, Martens, Olson & Bear, LLP

[57] ABSTRACT

Mobile fluid delivery systems and methods are disclosed. The disclosed embodiments are particularly useful for spraying herbicides on a roadside shoulder. The systems include nozzles mounted upon a movable arm extending from a vehicle. A sensor mounted upon the vehicle detects objects which the extended arm is approaching, such as telephone or other utility poles on the side of the road. The sensor signals a control unit, which directs retraction of the movable arm to avoid collision with the object, and extension of the arm after passing the object. In targeted fluid delivery, the control unit can direct forward fluid spray to the backside of the object as the extended arm approaches, lateral fluid spray as the arm passes the object, and rearward fluid spray to the front side of the object as the arm is extended after passing the object. The system can thus effectively douse the ground surrounding a utility pole, for example, with herbicide and reduce fire hazard.

27 Claims, 9 Drawing Sheets

VEHICLE MOUNTED FLUID DELIVERY SYSTEM WITH RETRACTABLE ARM

REFERENCE TO RELATED APPLICATION

This application is a continuation-in-part of copending application Ser. No. 08/925,653, filed Sep. 9, 1997.

BACKGROUND OF THE INVENTION

This invention relates to mobile fluid delivery systems in general. More particularly, this invention relates to vehicle-mounted fluid delivery systems for selectively delivering to a delivery area surrounding an object adjacent the vehicle path while the vehicle is in motion.

Mobile fluid delivery systems are used in a wide variety of applications, including weed abatement and control, fertilizer application for agricultural and landscaping purposes, mobile spray paint applications, and the like. In all such systems, a fluid delivery system, including one or more fluid ejectors, is mounted on appropriate portions of a vehicle to deliver the fluid in a desired pattern. For example, in weed control applications, a series of spray nozzles is typically mounted transversely to the rear of the vehicle on a fixed or movable arm extending from one or both sides of the vehicle. An appropriate herbicide can thus be sprayed outwardly from the side of the vehicle in a pattern extending generally perpendicular to the path of the vehicle. In the past, fluid delivery systems have typically been arranged for manual operation by the driver of the vehicle or an occupant of the vehicle. More recently, systems have been introduced (for weed control applications) in which automatic operation of the fluid delivery system is made possible by the use of a foliage sensing unit which generates a control signal to indicate the presence of a weed to be sprayed with an herbicide.

Conventional mobile fluid delivery systems are functionally and structurally limited by the operational reality of roadside obstacles, such as trees, telephone poles, boulders and the like. For example, for railroad weed control systems, care must be taken to ensure that any portion of the fluid delivery system which extends laterally of the rail truck be limited in length to avoid striking obstacles encountered along the side of the rail bed. This limits the lateral extent to which a weed control herbicide can be applied.

For non-rail vehicles, such as herbicide spraying trucks and fertilizer trucks, the vehicle must be operated in such a manner as to maneuver around obstacles such as trees, telephone poles, boulders and the like. Conventional sprayers can be manually operated to spray around obstacles. Such manual operation, however, requires a spray head mounted near the edge of the vehicle, capable of spraying outwardly for several feet. Moreover, such spraying cannot be used in conjunction with a foliage sensing unit, and the spray would not adequately cover all sides of an obstacle. As a consequence, the efficiency with which such mobile fluid delivery systems can be operated is severely impaired, both with respect to the time required to complete a given fluid delivery project and the monetary cost of doing so.

SUMMARY OF THE INVENTION

The invention comprises a mobile system for delivering a fluid to a fluid application area, which is relatively inexpensive to implement and to operate. The system ensures optimum delivery of a desired fluid to one or more fluid application areas, regardless of the nature and number of lateral obstacles encountered.

In accordance with one aspect of the present invention, a mobile system for delivering fluid includes a mobile arm configured to movably mount upon a vehicle. A fluid delivery device, such as a nozzle, is mounted upon the mobile arm. An actuator can move the mobile arm between a first position and a second position. The system also includes a sensor which generates a sensor signal in response to a detected object. A controller connected to the sensor directs the actuator to move the mobile arm between the first position and the second position in response to the sensor signal.

In an exemplary embodiment, the sensor is mounted to the front of the vehicle, and sends a signal causing retraction when an object (such as a utility pole) is detected adjacent the vehicle path.

In accordance with another aspect of the invention, a mobile fluid delivery system for mounting upon a vehicle includes a fluid delivery device capable of spraying fluid in a first direction and a second direction. The system also includes a sensor which generates sensor signals in response to a detected object adjacent the vehicle. In response to the sensor signal, a controller generates controller signals which direct the fluid delivery device to spray fluid in the second direction.

In accordance with another aspect of the invention, a system for targeted fluid delivery includes a vehicle which can move forwardly along a path. An arm is mounted upon the vehicle, and can move between an extended position and a retracted position. A fluid delivery device, in turn, mounts upon the arm and is capable of spraying fluid forwardly and laterally. A sensor detects an object adjacent the vehicle path. The system also includes a controller which retracts the arm and directs the fluid delivery device to spray fluid laterally in response to the sensor detecting the object.

In accordance with another aspect of the present invention, a method of delivering fluid is provided. The method includes moving a fluid delivery device in a forward direction along a path intersecting an object. The object is detected as the fluid delivery device approaches the object, and a signal generated in response to detecting the object. In response to the signal, in turn, the fluid delivery device moves in a lateral direction from the path. As the fluid delivery device is moved from the path, the fluid delivery device continues to move in the forward direction. The fluid delivery device then extends after passing the object.

In accordance with another aspect of the invention, a method is provided for selectively delivering fluid to a targeted area. The method includes moving a vehicle along a longitudinal path in a forward direction. A fluid delivery device is extended in a lateral direction from the vehicle to a first position. An object is detected as the fluid delivery device approaches the object, and a fluid is sprayed forwardly. The fluid delivery device is retracted toward the vehicle to a second position after the object is detected. While the fluid delivery device is in the second position, fluid sprays laterally from the fluid delivery device.

Mobile fluid delivery systems according to the invention permit the fluid delivery device to be extended laterally of the vehicle without regard to the nature and extent of potentially interfering obstacles which might be encountered in use. When an obstacle approaches the vehicle, the arm is automatically retracted at the appropriate time to avoid contact with the obstacle, and is extended back to the desired operating lateral position when the relative positions of the arm and the obstacle are no longer potentially interfering. Furthermore, the preferred embodiments enable targeted fluid delivery around objects adjacent the vehicle path.

BRIEF DESCRIPTION OF THE DRAWINGS

These aspects and others will be apparent from the ensuing detailed description, taken in conjunction with the accompanying drawings, in which.

DETAILED DESCRIPTION OF THE PREFERRED EMBODIMENT

Figure 1:
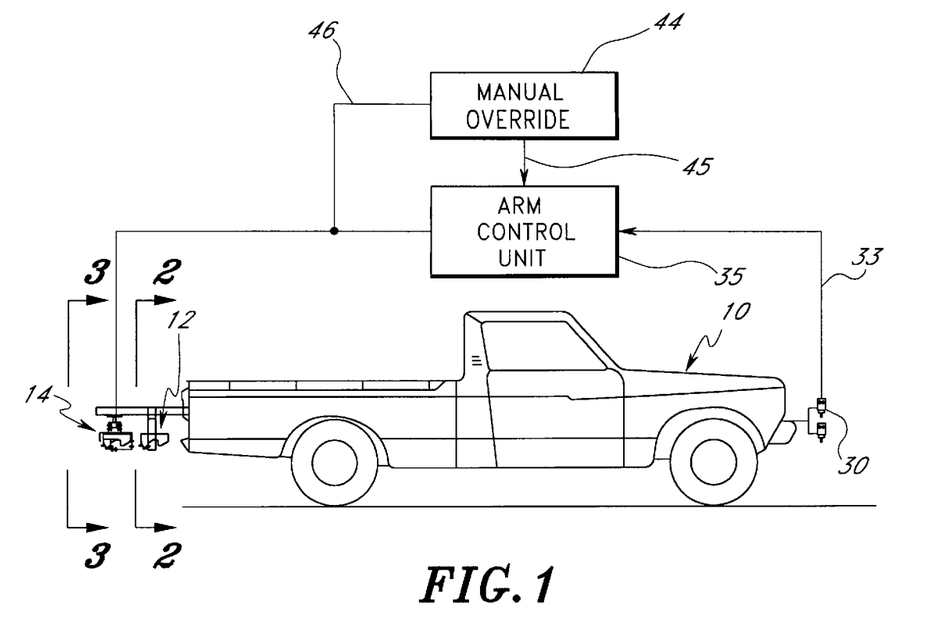
FIG. 1 is a side elevational view of a vehicle, illustrating a preferred embodiment of the invention.

Turning now to the drawings, FIG. 1 is a side elevational view of a vehicle incorporating a preferred embodiment of the invention. As seen in this figure, a vehicle generally designated with reference numeral 10 is provided with first and second rear mounted boom assemblies 12, 14. The vehicle 10 may comprise any one of a number of land based vehicles, such as a highway truck, an off-road vehicle, or a railroad car.

Figure 2:
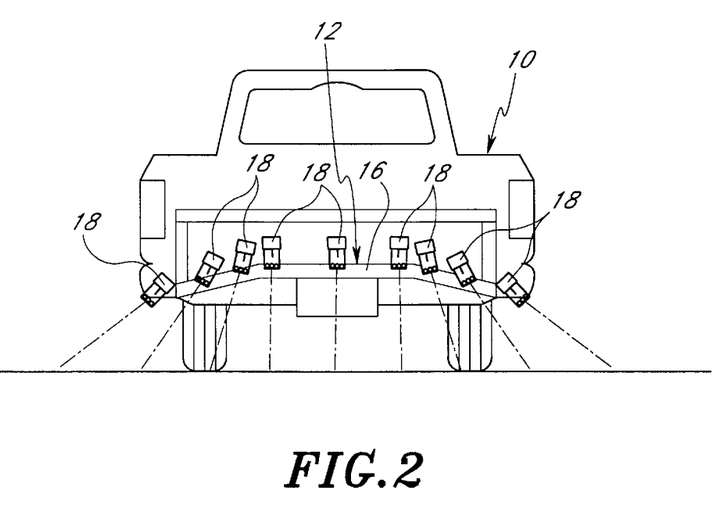
FIG. 2 is rear elevational schematic view taken along lines 2—2 of FIG. 1, illustrating a fixed boom assembly mounted on the vehicle of FIG. 1.

The fixed boom assembly 12 is a conventional arrangement and, as seen in FIG. 2, comprises a fixed boom 16 having a plurality of fluid delivery elements 18 distributed therealong to provide a fluid delivery pattern of appropriate length and width. The fluid delivery elements 18 may comprise liquid spray nozzles, gas valves or any one of a number of known devices used to deliver fluid from a holding tank (not shown) to an area to be subjected to the fluid. Examples of such fluids are herbicides used to control weed growth, fertilizer for plants and vegetation, and paint spraying equipment. Other examples will occur to those skilled in the art.

Figure 3:
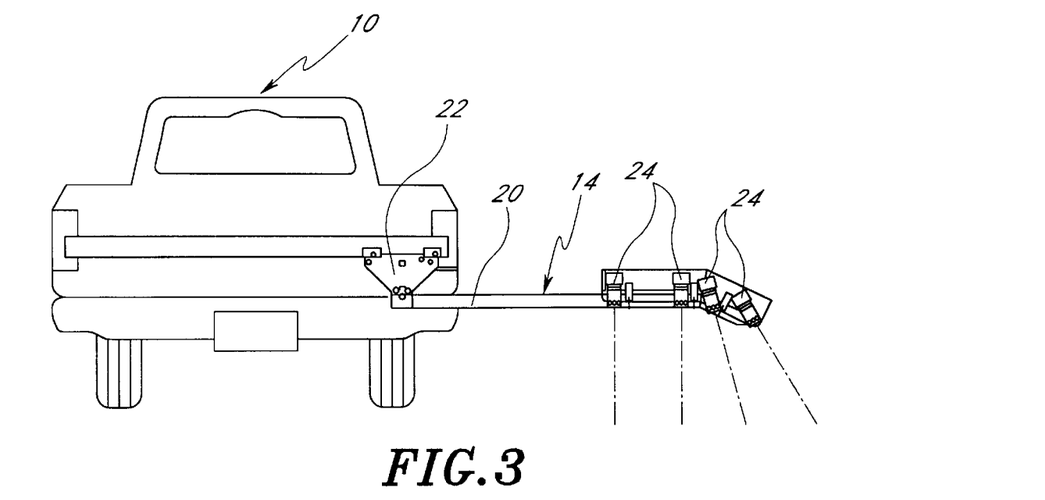
FIG. 3 is a rear elevational schematic view taken along lines 3—3 of FIG. 1, illustrating a movable boom assembly mounted on the vehicle of FIG. 1 with the boom fully extended.
Figure 4:
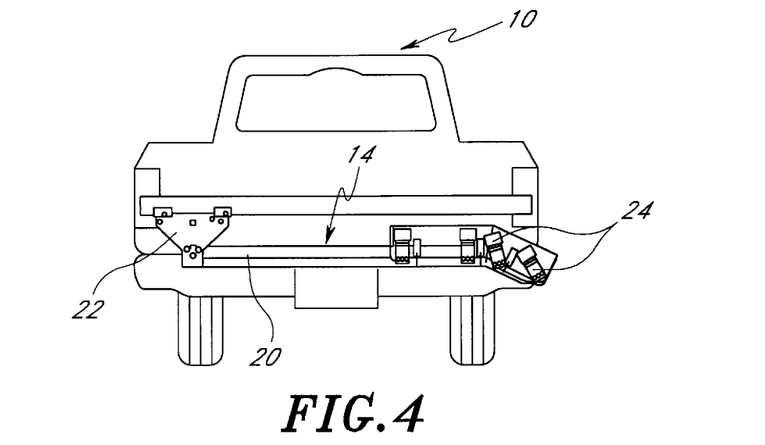
FIG. 4 is a rear elevational schematic view, similar to that of FIG. 3, with the movable boom in a fully retracted position.

Referring now to FIGS. 3 and 4, the movable boom assembly 14 includes an arm 20 and an actuator 22 capable of extending and retracting the arm 20 between a fully extended position (FIG. 3) and a fully retracted position (FIG. 4). The actuator 22 may comprise any one of a number of known actuators capable of translating the movable boom 20 between the two positions illustrated in FIGS. 3 and 4. Examples of such actuators include hydraulic, pneumatic, and electric linear actuators or motors. Since such devices are well known, further description is omitted. While not apparent from FIGS. 3 and 4, it will be understood that the movable boom assembly 14 can be used in conjunction with a fixed boom assembly 12, as shown in FIGS. 1 and 5.

Mounted to the outer portion of the arm 20 are a plurality of fluid delivery elements 24 similar in structure and function to the fluid deliver elements 18 carried by the fixed boom assembly 12 (FIG. 2). In a specific embodiment of a weed abatement implementation of the invention, the fluid delivery elements 24 comprise the weed sensor and spray nozzles of a WeedSeeker Selective Spray System™, available from Patchen™, Inc. of Los Gatos, Calif. Not illustrated in the figures are the common elements employed in any fluid delivery system, such as a fluid container, fluid routing line, pump, and power source. Such units are conventional and details thereof will be apparent to those of skill in the art.

Figure 5:
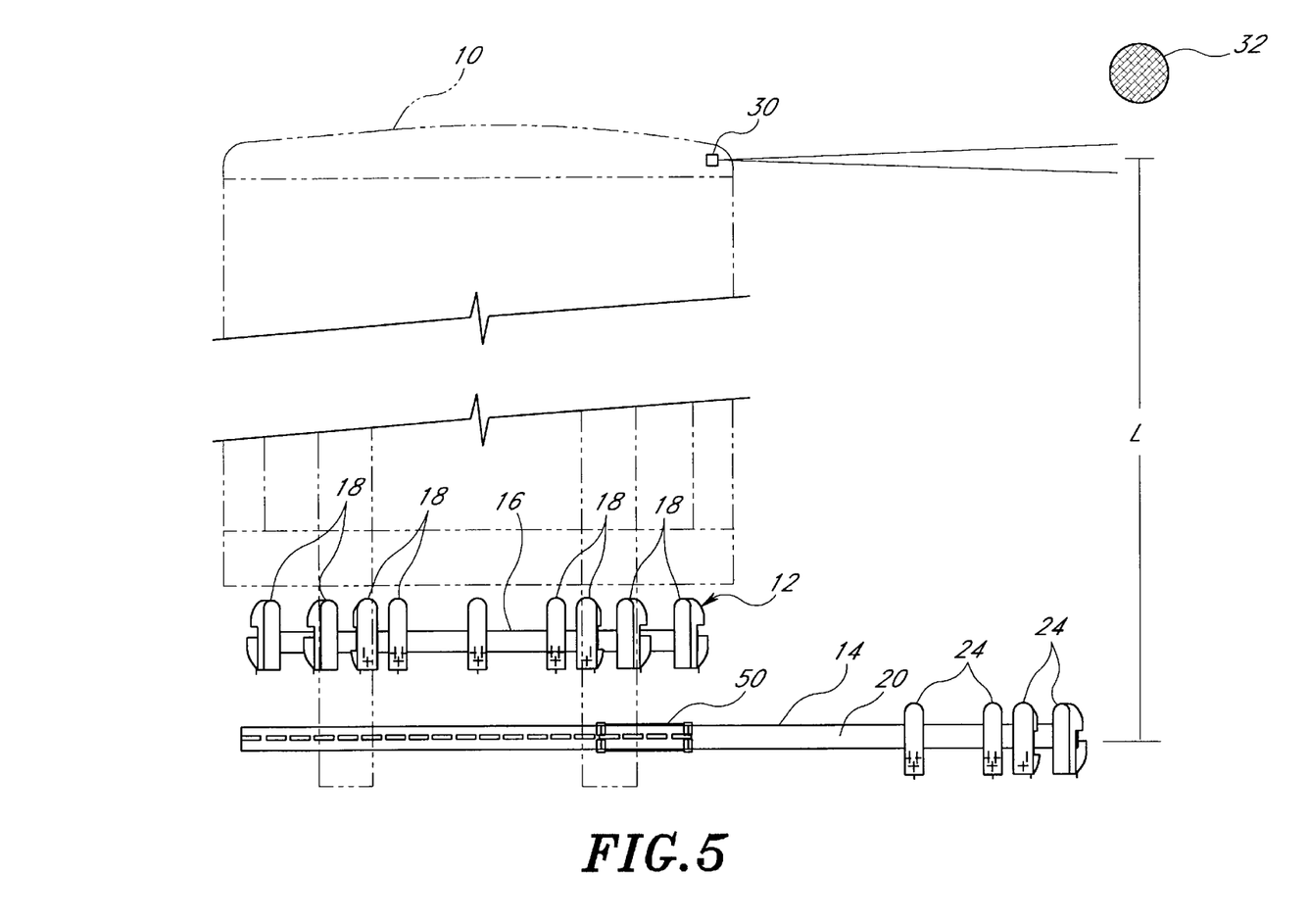
FIG. 5 is a schematic top view of the vehicle of FIG. 1, showing the placement of a sensor relative to the movable boom.

With reference to FIGS. 1 and 5, a sensor unit 30 is mounted on the forward portion of the vehicle 10. The sensor unit 30 is aimed in a direction generally laterally of vehicle 10 and functions to sense the approach of a potentially interfering obstacle 32, such as a telephone pole, which could collide with and damage the extended arm 20 as vehicle 10 progresses in the direction of the obstacle 32. In the illustrated embodiment, the sensor unit 30 comprises a Series 9000 Long Range Diffuse Photoelectric Sensor having a 6.5 degree field of view, available from Allen-Bradley Company. The skilled artisan will readily recognize that other types of sensors can perform the function described herein. In other arrangements, the sensor can also be directed more forwardly at an angle to the lateral direction.

When the approaching obstacle 32 is sensed by the sensor unit 30, a signal 33 is delivered to an arm control unit 35. In response to receipt of an impending obstacle signal 33 from the sensor unit 30, the arm control unit 35 generates an appropriate control signal to operate the actuator 22 with appropriate timing to retract the arm 20 from the path of the obstacle 32 prior to reaching the obstacle 32. Once the end of the arm 20 clears the obstacle 32, a control signal from the arm control unit 35 causes the actuator 22 to extend the arm 20 back to the original position.

Two alternative types of arm control units 35 can be provided with the system: one unit providing a fixed cycle and one providing a variable cycle. The fixed cycle implementation assumes that the vehicle be operated at a constant speed (which is most appropriate for a railroad car implementation). With a fixed vehicle speed, the time at which the arm 20 must be retracted to the FIG. 4 position can be simply calculated from the known speed and the distance L between the obstacle 32 when sensed and the location of the arm 20. In the illustrated embodiment, where the sensor 30 is aimed at 90° to the direction of travel, the distance L is equal to the distance between the location of sensor 30 and the location of the arm 20 along the length of vehicle 10. The arm control unit 35 can be implemented using any suitable known analog or digital circuitry.

Figure 6:
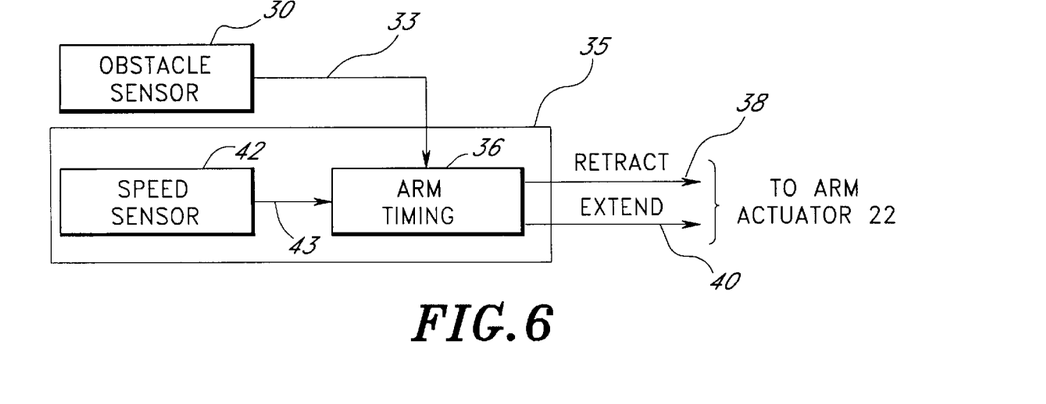
FIG. 6 is a block diagram of a variable cycle arm implementation control unit.

FIG. 6 illustrates the operation of an arm control unit 35 employing variable cycle time. As shown, the obstacle sensor 30 provides the impending obstacle signal 33 to an arm timing unit 36, which is capable of generating a RETRACT signal 38 and an EXTEND signal 40. The arm control unit 35 also includes a vehicle speed sensor 42, which sends a measured vehicle speed signal 43 as a second input to the arm timing unit 36. The vehicle speed sensor 42 may be any one of a number of conventional devices known to those skilled in the art, capable of generating a signal representative of the vehicle speed. In response to the impending obstacle signal 33, the arm timing unit 36 calculates the timing of the RETRACT and EXTEND operations from the signal 43 representing the measured vehicle speed 43 and the fixed distance L between the obstacle sensor 30 and the arm 20. As with the fixed cycle implementation, the arm timing unit 36 may be implemented in either analog or digital form using conventional design and construction techniques.

With reference again to FIG. 1, in some modes of operation, it may be desirable to provide for an optional manual override to enable the vehicle driver or other occupant to manually control the position of the arm 20. In such cases, a manual override unit 44 is provided which is capable of disabling the arm control unit 35 and enabling a human operator to control the position of the arm 20. The manual override unit 44 may be implemented in a variety of ways. The unit 44 preferably functions to disable the automatic arm control unit 35 by means of a disable connection 45, and controls the generation of the RETRACT and EXTEND signals furnished to actuator 22 by means of an additional signal path 46.

In the event of loss of power or other system failure, it is possible that the arm 20 could be fixed in the extended position illustrated in FIG. 3. In order to prevent damage to the arm 20 and the fluid delivery elements 24, a safety breakaway mechanism is incorporated into boom assembly 14 to permit the arm 20 to deflect when struck by an undetected obstacle. The breakaway mechanism may comprise a flex joint 50 (FIG. 5) of conventional design, located inboard of the arm 20, or any other equivalent mechanism.

As will now be apparent, mobile fluid delivery systems described herein enable the vehicle to be operated without regard to the presence or absence of obstacles which might be encountered by the extended fluid delivery system elements. In addition, the invention may be implemented on a wide variety of vehicles in a wide variety of fluid delivery system applications without requiring major modifications to the vehicle. Significantly, the vehicle may be operated at optimum speed and along a linear path, or along a contoured path, which closely follows the edge of the area to which the fluid is to be delivered.

While the sensor 30 has been disclosed as preferably mounted on the front of vehicle 10, other locations may be chosen, provided that the retracting mechanism has sufficient time to position the arm 20 to a non-interfering position. For example, in one embodiment, the sensor can be located on the movable arm, facing forward. Such a sensor would measure the distance of the arm from an approaching obstacle, and send a signal to the arm control unit. Based upon the known vehicle speed (constant or variable), the arm control unit would then send RETRACT and EXTEND signals with appropriate timing to avoid having the arm collide with the obstacle.

In other arrangements, it will be recognized that the sensor can be located on the vehicle and facing at an acute angle to the lateral direction (e.g., angled between the lateral and forward directions). The arm control unit can calculate the time it will take for the movable boom to reach the obstacle from the angle of the sensor relative to the forward direction of travel (known), the distance from the sensor to the obstacle (measured), and the speed of the vehicle (known or measured).

In another embodiment, the arm need not be fully retracted in response to the generation of an impending obstacle signal from the sensor—it is only necessary that the arm be retracted to a position at which impact with an obstacle is avoided. Additional signals can be provided to measure the lateral distance of the obstacle from some reference point on the vehicle. The resulting information can be used to control the amount of inward travel of the arm necessary to avoid impact with the approaching obstacle.

Figure 7:
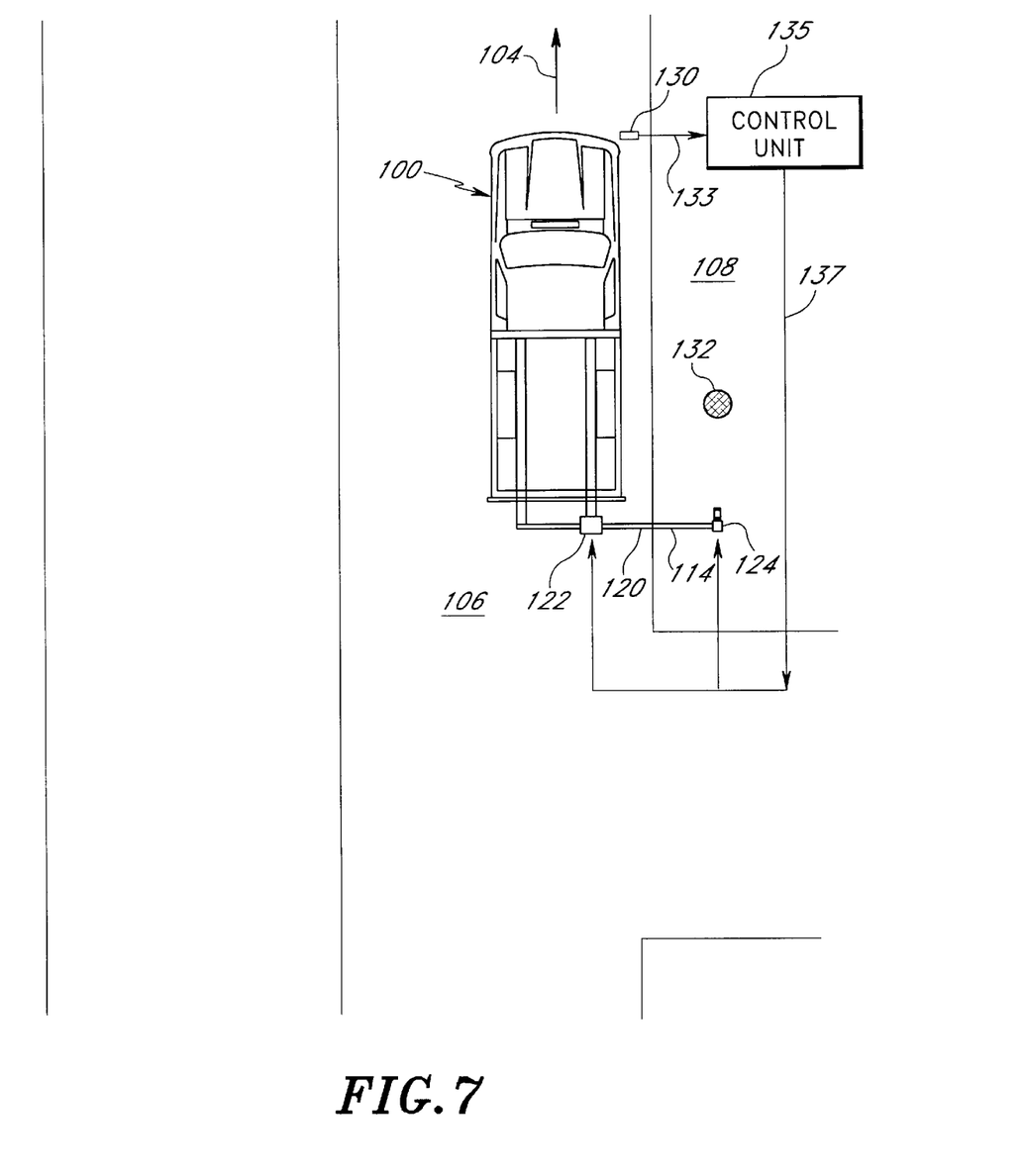
FIG. 7 is a schematic top down view of a vehicle outfitted with a fluid delivery system in accordance with a second preferred embodiment, illustrating a movable boom approaching an obstacle.
Figure 8:
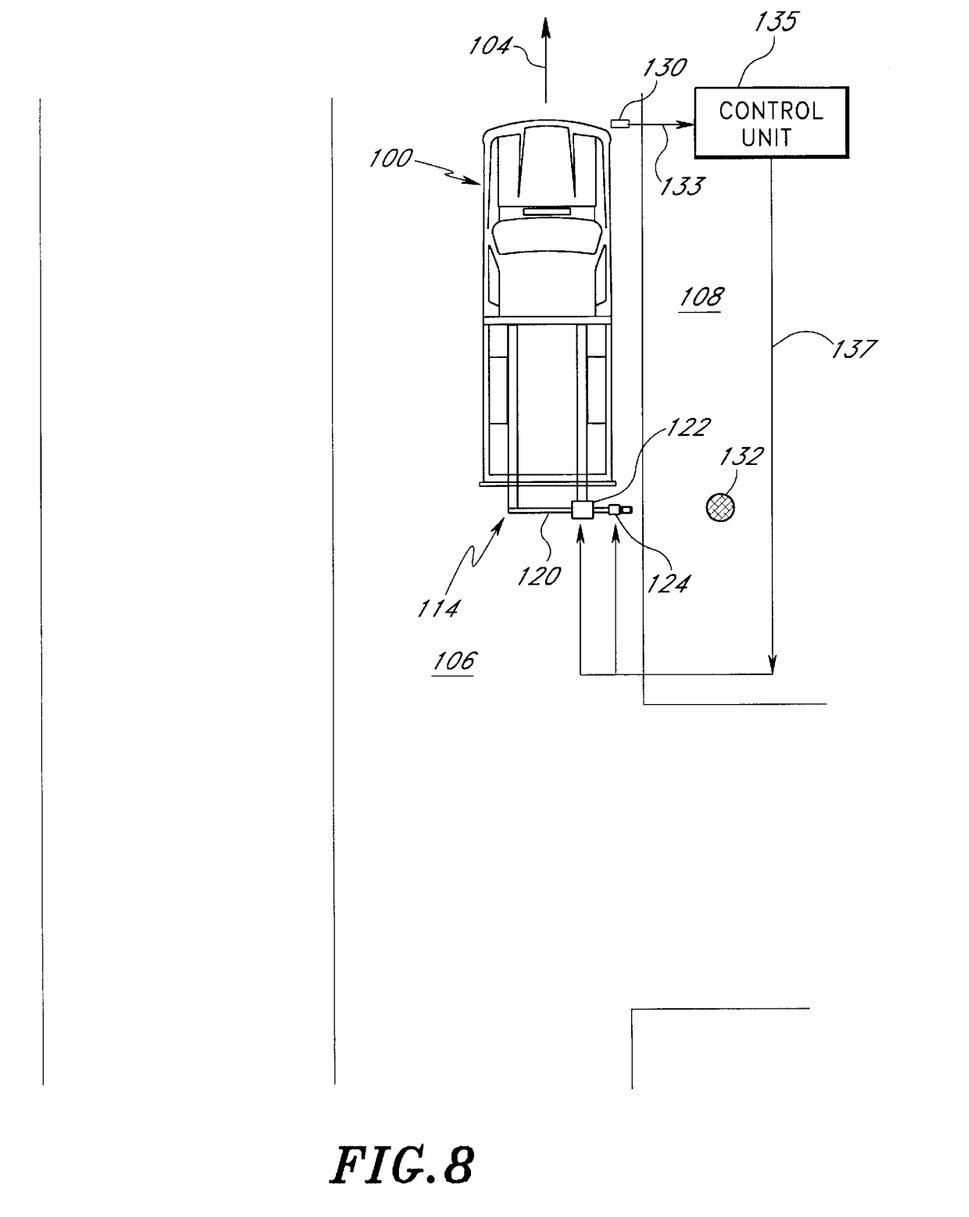
FIG. 8 shows the vehicle of FIG. 7, with the movable boom retracted as it passes the obstacle.
Figure 9:
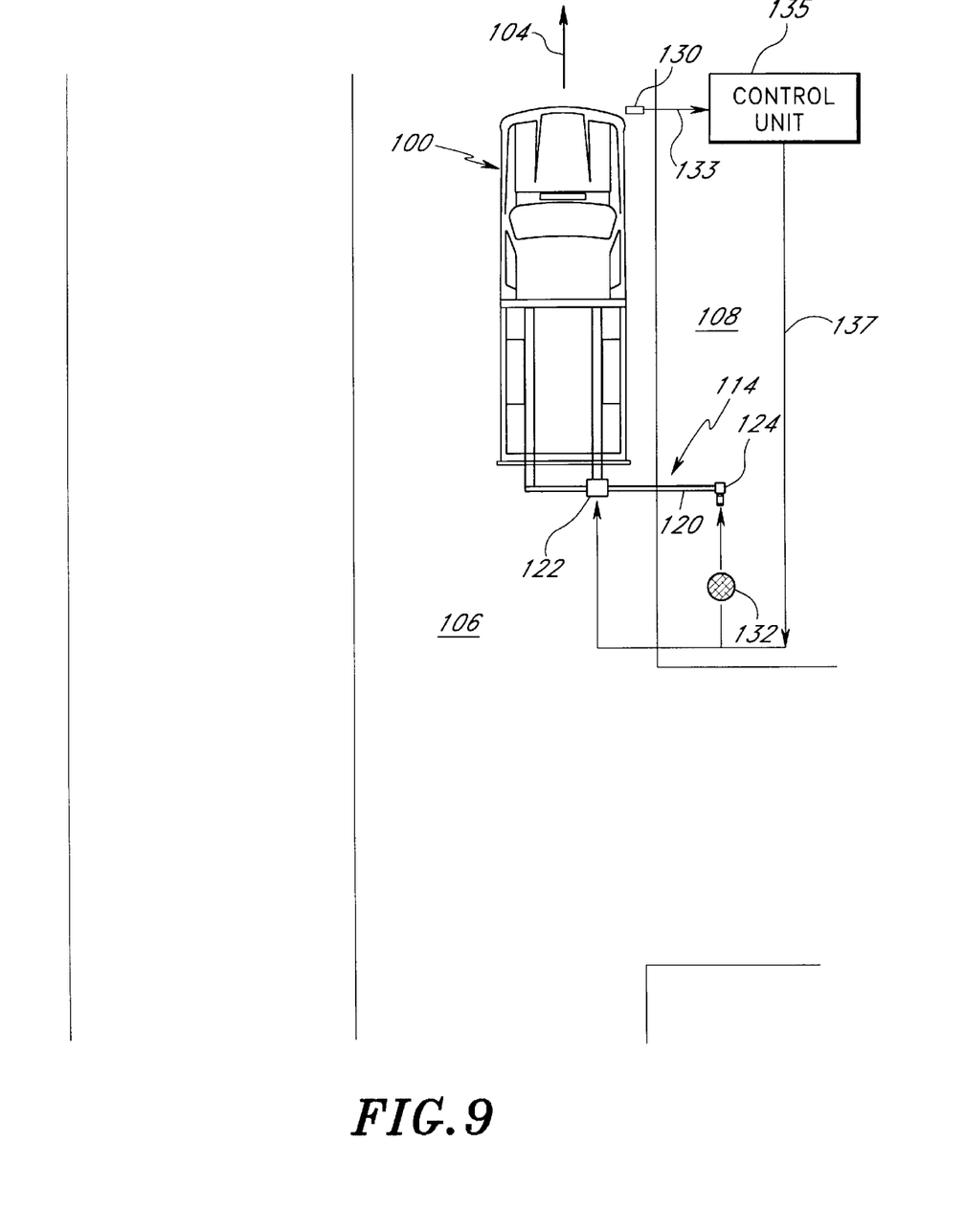
FIG. 9 shows the vehicle of FIG. 8, with the movable boom extended after it has passed the obstacle.

With reference now to FIGS. 7–9, another vehicle 100 is shown outfitted with a fluid delivery system in accordance with a second preferred embodiment. The vehicle 100 is shown moving in a direction indicated by arrow 104 on a road or path 106. As will be understood from the following description, the fluid delivery system is designed to not only avoid damage to an extended boom, but also to more effectively direct fluid delivery to a particular location.

The illustrated embodiment is specifically directed to delivering fluid in the immediate vicinity of an object 132 located on a shoulder 108 of the road 106, or otherwise adjacent the path of the vehicle 100. For example, utility companies will often wish to control weed or other plant growth in the immediate vicinity of a pole to reduce the risk of any fire reaching the pole. Herbicide is thus desirably delivered around the base of the utility pole. The skilled artisan will also find application for the invention in the targeted delivery of fluid to areas surrounding switches or other obstacles near railway tracks, as well as other applications.

Conventionally, "targeted" fluid delivery is accomplished by heavily dousing the region around the pole for one side of the pole. Other applications in which targeted fluid delivery is desirable will be apparent to those skilled in the art. Such a targeted fluid delivery system can also be used in conjunction with systems for wider fluid dispersal, such as that illustrated in FIGS. 1–6.

A movable boom assembly 114 is mounted to the rear of the vehicle 100. While illustrated schematically only in FIGS. 7–9, it will be understood that the assembly 114 be similar to that illustrated in FIGS. 3 and 4. The movable boom assembly 114 thus includes a movable arm 120, an actuator 122, and at least one fluid delivery element or nozzle 124. The nozzle 124 is connected via hoses or the like to a fluid source (not shown), which can be stored in the truck bed. The nozzle 124 of the illustrated embodiment is rotatable. Such nozzles are commercially available under the trade name TeeJet™, from Spraying Systems in Wheaton, Ill.

The fluid delivery system also includes a sensor 130, which can be as described with respect to the previous embodiment (i.e., a Series 9000 Long Range Diffuse Photoelectric Sensor having a 6.5° field of view, available from Allen Bradley Company). Preferably, the sensor 130 is mounted at or near the front of the vehicle 100 and aimed laterally at about 90° to the vehicle's direction of travel 104, to simplify the calculation of timing for operations set forth below.

In FIG. 7, the sensor 130 has already passed and sensed the presence of object 132 as the front portion of the vehicle 100 passes the object 132. The sensor 130 has thus generated a signal 133, which is received by a control unit 135. In some arrangements, the sensor can sense both a back edge and a front edge of the object, such that the signal 133 can include information regarding the relative position and width (longitudinal dimension) of the object. Alternatively, the control unit 135 can be programmed to assume a constant average width of the object 132.

The control unit 135 may include a speed sensor and a timer, as will be understood from the previous embodiment.

Inputs to the control unit 135 could thus include: the vehicle speed (constant or measured); the signal 133 indicating an approaching object; the width of the object 132 (average or measured by the sensor 130 and included in the signal 133); and the distance between the object when sensed and the movable arm 120 (constant L in the illustrated embodiment). In other arrangements, the lateral distance of the object from the vehicle can also be measured and can also be included in the signal from the sensor to the control unit, or can be provided by a separate signal.

Utilizing these inputs, the control unit 135 then calculates the appropriate timing and generates control signals 137, which direct several operations. The control unit 135 initially causes the nozzle 124 to spray fluid forwardly, toward the backside of the approaching object 132, as shown in FIG. 7. "Forwardly," as utilized herein, refers to the horizontal dimension and encompasses spray which is centered around a direction with a significant forward component, preferably within about 45° (inwardly or outwardly) of the forward direction 104, and more preferably within about 30°. In the vertical dimension, the nozzle 124 is preferably angled downwardly to spray the base of the object 132.

Spraying in the forward direction 104 is preferably responsive to the signal 133 from the sensor 130. In the illustrated embodiment, the nozzle 124 is preferably already facing the forward direction 104 as it approaches the object 132, even before the sensor 130 detects the object, such that rotation of the illustrated rotatable nozzle 124 is not responsive to the approaching object 132. Rather, as will be better understood from the following description, the nozzle 124 has been rotated after previously passing out of spray range of an object now behind the vehicle 100. Spraying in the forward direction 104 is, however, responsive to the sensor 130 detecting the approaching object 132, in the sense that a valve within the nozzle 124 is opened after the object 132 is detected, and control signals 137 cause the fluid spray.

It will be understood that, in other arrangements, spraying in the forward direction can include rotating the nozzle to face the forward direction. On the other hand, for some applications, the fluid spray is desirably constant even between obstacles, such that the valve of the nozzle is constantly open.

With reference to FIG. 8, the control signals 137 cause the actuator 120 to retract the movable arm 120 toward the vehicle 100 (laterally) as it passes the object 132. At the same time or shortly after the retraction is initiated, the control signals 137 from the control unit 135 direct the nozzle 124 to spray fluid in a laterally outward direction. As noted with respect to the forward direction, "laterally" refers to the horizontal dimension and encompasses spray which is centered around a direction with a significant lateral component, preferably within about 45° of the lateral direction, and more preferably within about 30°. The result of both the retraction and causing lateral spraying is illustrated in FIG. 8.

In the illustrated embodiment, causing lateral fluid spray includes the step of rotating the nozzle 124 from its forward-facing orientation (FIG. 7) to a lateral-facing orientation (FIG. 8). Preferably, the nozzle 124 rotates while fluid continues to flow from the nozzle 124 and while the arm 120 is retracting.

Referring to FIG. 9, the control unit 135 calculates the length of time it takes the nozzle 124 and movable arm to pass the object 132, based upon the known or measured vehicle speed and the standard or measured width of the object 132. Once the control unit 135 indicates that the object 132 has been passed, based upon a timing operation, the movable arm 120 extends until the nozzle 124 is again adjacent the object 132. At the same time, the control signals 137 direct the nozzle 124 to spray fluid rearwardly, that is, opposite to the forward direction 104, toward the object 132 as the vehicle 100 proceeds in the forward direction 104. As noted with respect to the forward and lateral directions, "rearwardly" refers to the horizontal dimension and encompasses spray which is centered around a direction with a significant rearward component, preferably within about 45° of the rearward direction, and more preferably within about 30°.

In the illustrated embodiment, causing rearward fluid spray includes rotating the nozzle 124 from its lateral-facing orientation (FIG. 8) to a rearward-facing orientation (FIG. 9). Preferably, the nozzle 124 rotates while fluid continually flows from the nozzle 124 and while the arm 120 is extending.

As will be understood in view of FIGS. 7–9, the illustrated system of fluid delivery enables direct application of fluids to three sides of the object 132. Due to the automated extension of the movable arm 120, typically divergent fluid spray can also reach the far side of the object 132 from the forward-facing nozzle orientation behind the object 132 (FIG. 7) and from the rearward-facing nozzle orientation in front of the object 132 (FIG. 9). Less fluid is wasted by avoiding the need for a heavy dousing from only one side of the object.

Furthermore, the target fluid delivery can be accomplished without halting the vehicle, without the need for manual spray direction, and without damaging the boom assembly 114. A single vehicle operator can simply drive the vehicle 100 on the proper course, and fluid flow is automatically and appropriately directed.

In the illustrated embodiment, where it is desirable to spray fluid (e.g., herbicide) only in the immediate vicinity of the interfering object, the fluid spray is halted after the vehicle moves a distance at which the object 132 is outside the spray range. The nozzle 124 is then preferably rotated to the position indicated in FIG. 7 in anticipation of the next object. It will be understood, however, that it may be desirable to continue delivery of fluid between objects, such as for purposes of keeping the entire roadside shoulder 108 clear of plant growth. To this end, it will be understood that the nozzle 124 can be continuously operated, and that further fluid delivery elements can be provided along the length of movable or fixed booms, as illustrated in the embodiment of FIGS. 1–6.

Figure 10:
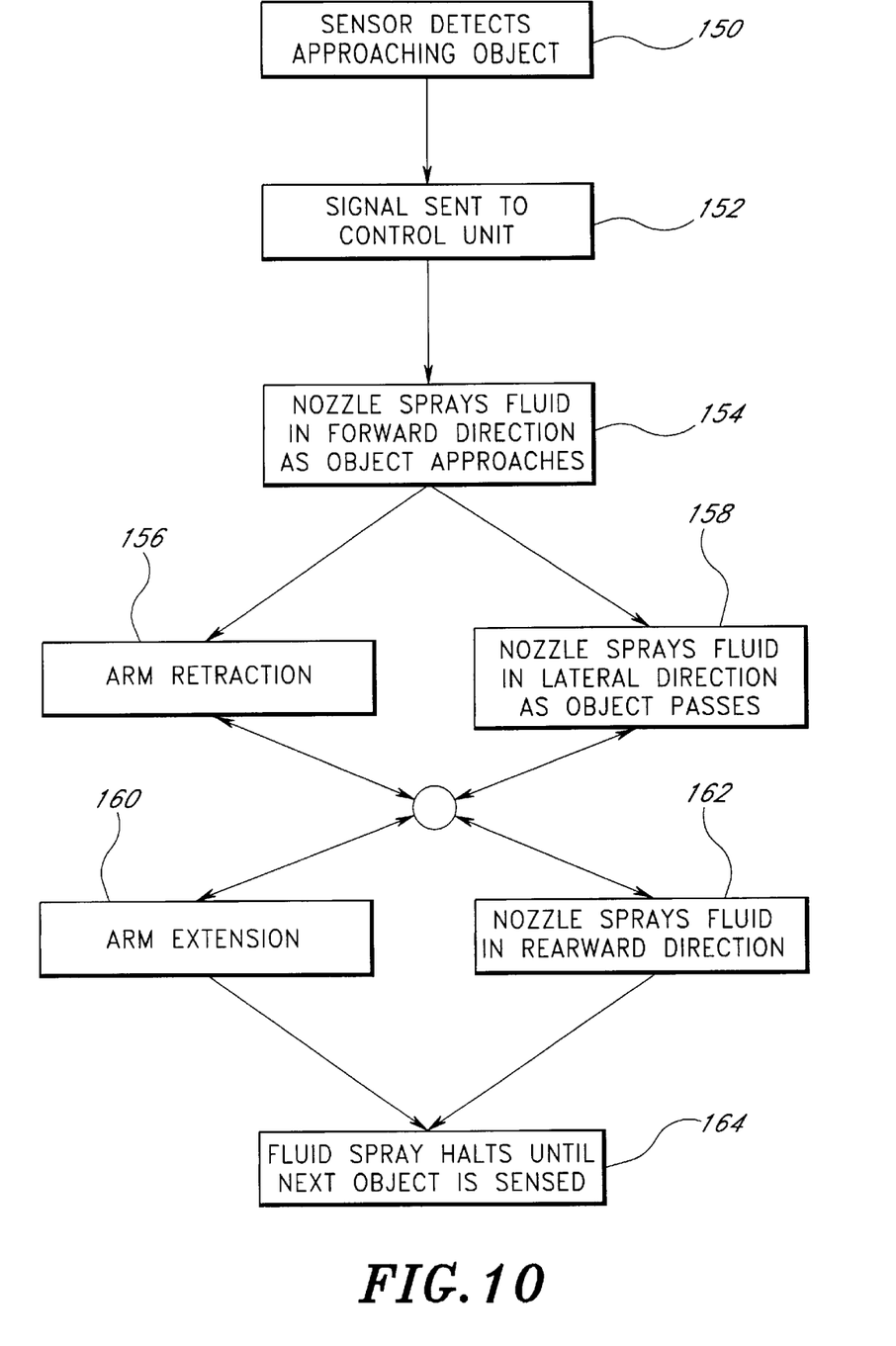
FIG. 10 is a flow chart generally illustrating a process for targeted fluid delivery.

FIG. 10 graphically summarizes the process set forth in the above description of FIGS. 7–9. Throughout the illustrated process flow, the vehicle proceeds in the forward direction. Initially, at least a part of the boom assembly is on a path intersecting with an object to be sprayed. The sensor detects an approaching object in path of the boom assembly. This operation is represented by step 150 in FIG. 10. The sensor then sends 152 a sensor signal to the control unit, which in turn sends control signals directing the nozzle to forwardly spray 154, that is, to spray in the direction of the object which the boom assembly is approaching.

The control unit then directs retraction 156 of the movable arm in time to avoid collision with the object. Preferably, the control signals cause retraction 156 and direct laterally spraying 158 fluid simultaneously, as indicated in FIG. 10. The skilled artisan will understand, however, that the control unit can be programmed to direct steps 158 and 158 sequentially with either of the steps performed first, if desired. As noted with respect to FIGS. 7–9, step 158 preferably involves rotation of the nozzle while continually spraying fluid, such that the system continues to deliver fluid in the direction of the object during retraction, as the object begins to pass the boom assembly.

Depending upon the width of the object, the control signals direct continued lateral spraying 158 prior as the vehicle proceeds forwardly. For an object with the width of a utility pole, however, the control unit directs extension 160 of the arm and rearwardly spraying 162 fluid immediately upon completion of the retraction operation 156. Rearwardly spraying 162 can thus involve continued rotation of the preferred rotatable nozzle 124 of FIGS. 7–9.

As also noted above, the control unit preferably halts 164 fluid flow after the nozzle has passed beyond spray range of the object. The rotatable nozzle is then preferably rotated to face forward, in preparation of approaching another object to be sprayed.

FIGS. 11A–11F partially illustrate a targeted fluid delivery system in accordance with a third preferred embodiment, wherein the fluid delivery device comprises a plurality of nozzles mounted on the movable arm 120 in a plurality of orientations, replacing the rotatable nozzle 124 of FIGS. 7–9. In particular, the illustrated embodiment includes a forward-facing nozzle 124a, a lateral-facing nozzle 124b and a rearward-facing nozzle 124c. Suitable nozzles are available from Spraying Systems in Wheaton, Ill., under the trade name TeeJet™. Though not illustrated, it will be understood that the fluid delivery system of the third embodiment preferably includes the vehicle, sensor, control unit, actuator, and other elements of the previously described embodiments.

In the illustrated embodiment, unless otherwise noted, the sensing, retracting and extending operations can be as described with respect to the previous embodiments. Rather than rotating the nozzle, however, spraying in different directions, depending upon the position of the movable arm 120 relative to the object 132, is accomplished by opening and closing the valves of the plurality of nozzles 124a, 124b, 124c with appropriate timing.

Figure 11A:
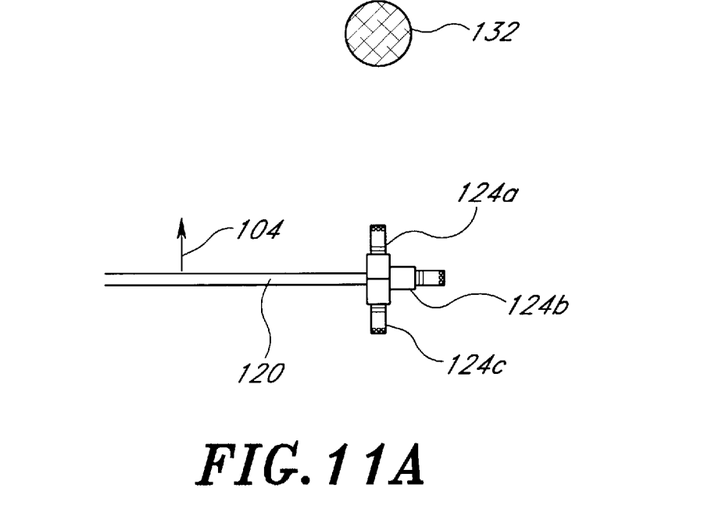
FIGS. 11A–11F schematically illustrate the operation of a mobile fluid delivery system in accordance with a third preferred embodiment.

FIG. 11A shows the movable arm 120 extended as it approaches the object 132, with the vehicle moving in the forward direction 104. When the sensor indicates that the arm 120 is nearing the object 132, the control unit sends signals directing the forward-facing nozzle 124a to spray forwardly toward the object.

Figure 11B:
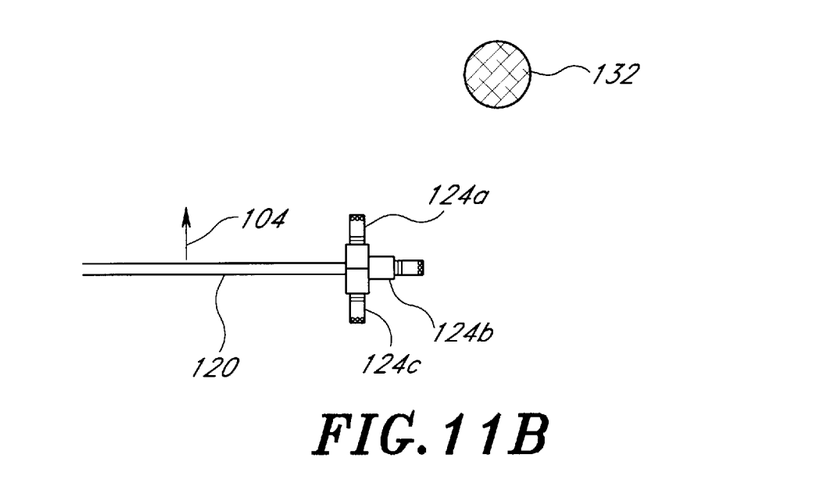

With reference now to FIG. 11B, the control signals direct the actuator to retract the movable arm 120 in time to avoid collision with the object 132. At the same time or slightly after retraction is initiated, the control unit directs laterally spraying from the lateral-facing nozzle 124b. Preferably, retraction of the movable arm 120 and initiation of lateral spraying are simultaneous. In the illustrated embodiment, the valves of the forward-facing nozzle 124a and the lateral-facing nozzle 124b are simultaneously open for a period of time, such that laterally spraying overlaps with forwardly spraying. The ground between areas adjacent the back and lateral surfaces of the object 132 thus receive fluid from the open forward-facing nozzle 124a as the arm 120 retracts, and from the open lateral-facing nozzle 124b as the vehicle 100 carries the arm 120 in the forward direction 104.

Figure 11C:
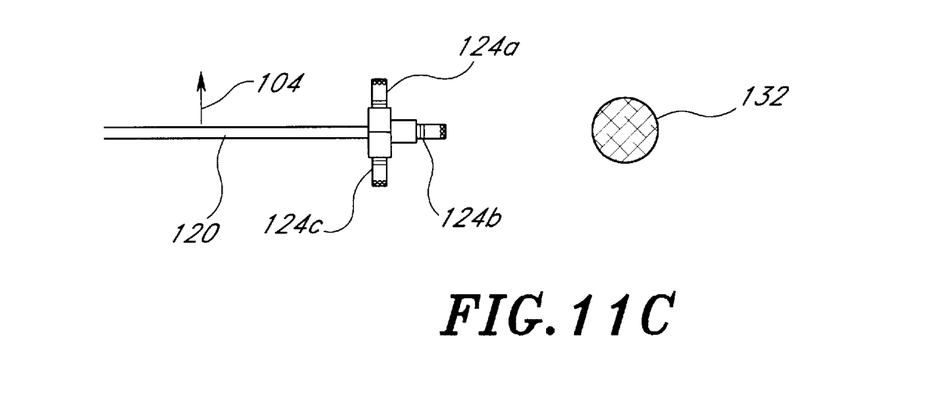

FIG. 11C shows the arm 120 in a fully retracted position, as the vehicle has continued to move in the forward direction 104. By the time the arm 120 is fully retracted, the forward-facing nozzle 124a is no longer spraying in the direction of the object 132. Preferably, therefore, the control signals direct closing the valve of the forward-facing nozzle 124a when or slightly before the arm 120 is fully retracted, to conserve fluid for application only to the base of the object 120. It will be understood that, in other arrangements, it may be desirable to continue spraying fluid in all directions simultaneously, thereby delivering fluid to a wider area of ground surrounding the object.

Figure 11D:
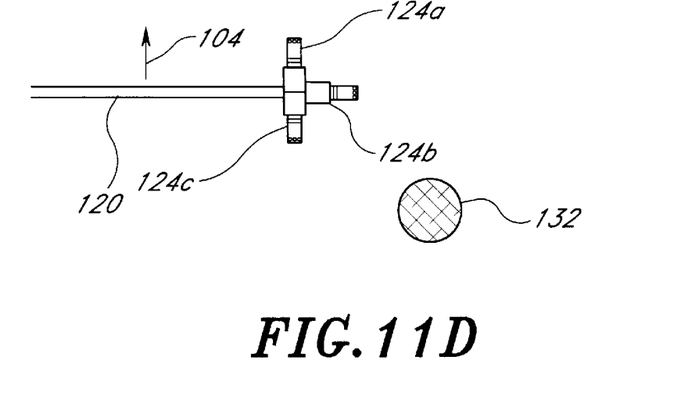

FIG. 11D shows the movable arm 120 in the midst of an extending operation. At the same time, the control signals have directed initiation of rearwardly spraying from the rearward-facing nozzle 124c. The lateral-facing nozzle 124b preferably continues to spray as the arm 120 is extended by the actuator in response to control signals from the control unit. The ground between areas adjacent the lateral and front surfaces of the object 132 thus receive fluid from the lateral-facing nozzle 124a as the vehicle 100 carries the arm 120 in the forward direction 104, and from the rearward-facing nozzle 124b as the arm 120 extends.

Figure 11E:
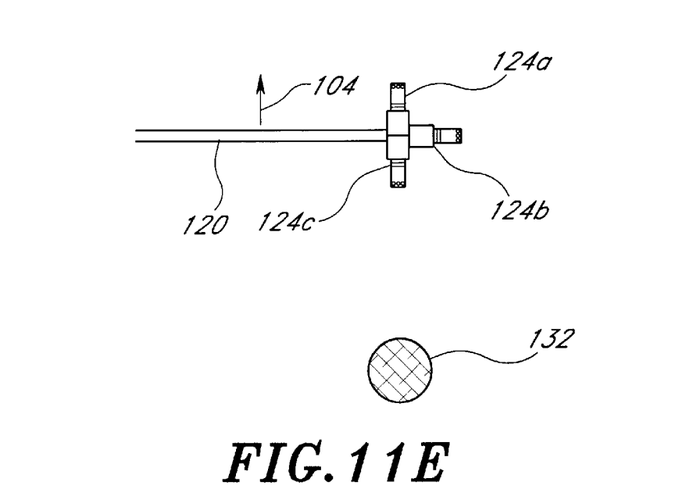

FIG. 11E shows the movable arm 120 fully extended, with the fluid delivery device adjacent the front side of the object 132. In particular, the rearward-facing nozzle 124c is adjacent the object 132 within the nozzle spray range, and is spraying rearwardly in the direction of the object 132. As illustrated, by the time the arm 120 is fully extended, the lateral-facing nozzle 124b has stopped spraying. Preferably, therefore, the control signals direct closing the valve of the lateral-facing nozzle 124b when or slightly before the arm 120 is fully extended, to conserve fluid for application only to the base of the object 120. It will be understood, of course, the control unit can be programmed to continue delivering fluid out of all nozzles whenever in the vicinity of an object, or even between objects.

Figure 11F:
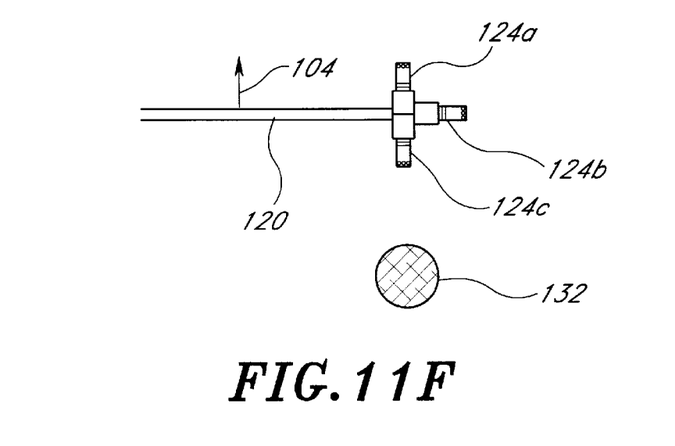

FIG. 11F illustrates the fluid delivery system after the vehicle and the arm 120 have moved in the forward direction 104 to the point at which the object 132 is outside the spray range of the rearward-facing nozzle 124c. For the illustrated targeted spray application, the valve of the nozzle 124c is closed at this point, to conserve fluid.

As will be understood by the skilled artisan, the process shown in FIGS. 11A–11F can be repeated for each object encountered as the vehicle proceeds.

One of ordinary skill in the art will further understand, in light of the present disclosure, that selective fluid spray in a selected direction, in conjunction with sensing an object to be targeted for spray, can be advantageous with or without the movable or retractable arm of the preferred embodiment.

Various modifications, alternate constructions and equivalents to the illustrated embodiments will occur to those skilled in the art. For example, while a specific spray nozzle and sensor have been used in the weed abatement implementations described above, other system elements may be employed, depending on the requirements of a given application. Therefore, the above should not be construed as limiting the invention, which is defined by the appended claims.

We claim:

1. A mobile system for delivering fluid, the system comprising:

a mobile arm configured to movably mount upon a vehicle;

a fluid delivery device mounted upon the mobile arm;

an actuator capable of moving the mobile arm between a first position and a second position;

a sensor capable of generating a sensor signal in response to a detected object; and a controller connected to the sensor and directing the actuator to move the mobile arm between the first position and the second position in response to the sensor signal, wherein the controller generates fluid flow control signals in response to the sensor signal, the fluid flow control signals directing the fluid delivery device to spray fluid in the direction of the object.

2. The system of claim 1, wherein the fluid flow control signals direct the fluid delivery device to spray fluid in the direction of the object when the mobile arm is in each of the first and second positions.

3. The system of claim 2, wherein the fluid delivery device comprises a nozzle rotatable in response to the fluid flow control signals.

4. The system of claim 2, wherein the fluid delivery device comprises a plurality of nozzles openable and closable in response to the fluid flow control signals.

5. The system of claim 1 wherein the fluid delivery device comprises a spray nozzle.

6. The system of claim 1, where in the actuator comprises an electric motor.

7. The system of claim 1, wherein the mobile arm includes a safety breakaway mechanism enabling at least a part of the mobile arm to deflect when struck by an obstacle.

8. The system of claim 1, wherein the controller includes circuitry for controlling the actuator in response to a vehicle speed signal.

9. The system of claim 8, wherein the controller includes a vehicle speed sensor.

10. The system of claim 1, further comprising a manual override mechanism, including a controller disabler and a mechanism for manually controlling the actuator.

11. The system of claim 1, wherein the sensor comprises an optical sensor.

12. A mobile fluid delivery system for mounting upon a vehicle, the system comprising:
- a fluid delivery device capable of selectively spraying fluid in at least a first direction, the fluid delivery device comprising a movable arm mounted upon the vehicle;
- a sensor capable of generating sensor signals in response to a detected object adjacent the vehicle;
- a controller generating control signals in response to the sensor signals, the control signals directing the fluid delivery device to spray fluid in the first direction as the fluid delivery device approaches the object, and further directing the fluid delivery device to stop spraying fluid in the first direction; and
- an actuator responsive to the controller signals, the controller signals directing the actuator to retract the movable arm in response to the sensor signals.

13. The system of claim 12, wherein the fluid delivery device further comprises a nozzle rotatable in response to the controller signals, the nozzle mounted upon the movable arm.

14. The system of claim 12, wherein the fluid delivery device further comprises a plurality of nozzles mounted upon the movable arm in a plurality of orientations, the nozzles having valves openable and closable in response to the controller signals. direct changing the fluid flow from the first direction to the second direction changing.

15. A mobile fluid delivery system for mounting upon a vehicle, the system comprising:
- a fluid delivery device capable of selectively spraying fluid in at least a first direction;
- a sensor capable of generating sensor signals in response to a detected object adjacent the vehicle; and
- a controller generating control signals in response to the sensor signals the control signals directing the fluid delivery device to spray fluid in the first direction as the fluid delivery device approaches the object, and further directing the fluid delivery device to stop spraying fluid in the first direction, wherein the fluid delivery device is further capable of selectively spraying fluid in a second direction different from the first direction; and wherein the control signals in response to the sensor signals further direct changing the fluid flow from the first direction to the second direction.

16. The system of claim 15, wherein said first direction includes a significant component in a direction of vehicle travel; and wherein the second direction includes a significant component in a direction perpendicular to the direction of vehicle travel.

17. A system for targeted fluid delivery, the system comprising:
- a vehicle movable forwardly along a path;
- an arm mounted upon the vehicle, the arm movable between an extended position and a retracted position;
- a fluid delivery device mounted upon the arm, the fluid delivery device capable of spraying fluid forwardly and laterally;
- a sensor capable of detecting an object adjacent the path; and
- a controller directing retraction of the arm from the extended position to the retracted position and directing the fluid delivery device to spray fluid laterally in response to the sensor detecting the object.

18. A method of delivering fluid, comprising:
- moving a vehicle forwardly along a path adjacent an object, the vehicle including a fluid delivery device;
- detecting the object as the fluid delivery device approaches the object;
- generating a signal in response to detecting the object;
- moving the fluid delivery device laterally toward the vehicle in response to the signal;
- continuing to move the vehicle forwardly as the fluid delivery device moves toward the vehicle; and
- extending the fluid delivery device laterally away from the vehicle after the fluid delivery device passes the object.

19. The method of claim 18, further comprising forwardly spraying fluid toward the object through the fluid delivery device as the fluid delivery device approaches the object.

20. The method of claim 19, further comprising laterally spraying fluid toward the object through the fluid delivery device as the fluid delivery device moves laterally toward the vehicle.

21. The method of claim 20, further comprising spraying fluid rearwardly toward the object through the fluid delivery device after the fluid delivery device passes the object.

22. The method of claim 20, wherein the fluid delivery device includes at least one nozzle and laterally spraying the fluid comprises rotating the nozzle from a forward-facing orientation to a lateral-facing orientation.

23. The method of claim 20, wherein the fluid delivery device includes a forward-facing nozzle and a lateral-facing nozzle and laterally spraying the fluid comprises opening a valve in the lateral-facing nozzle.

24. A method of selectively delivering fluid to a targeted area, the method comprising:
- moving a vehicle along a longitudinal path in a forward direction;
- extending a fluid delivery device in a lateral direction from the vehicle to a first position;
- detecting an object as the fluid delivery device approaches the object;

spraying a fluid forwardly;

retracting the fluid delivery device toward the vehicle to a second position after the object is detected; and spraying the fluid laterally while the fluid delivery device is in the second position.

25. The method of claim 24, further comprising extending the fluid delivery device to the first position after the fluid delivery device passes the object.

26. The method of claim 25, further comprising spraying the fluid in a rearward direction after the fluid delivery devices passes the object.

27. The method of claim 24, wherein spraying the fluid forwardly comprises centering fluid spray in a direction within about 30° of the forward direction.

* * * * *